United States Patent [19]

Bragin et al.

[11] Patent Number: 4,671,487
[45] Date of Patent: Jun. 9, 1987

[54] GATE VALVE

[75] Inventors: Boris F. Bragin, Voroshilovgrad; Alexei F. Iljushin, Kurgan; Vladimir V. Kolosov, Kurgan; Mikhail A. Kulikov, Kurgan; Felix D. Markuntovich; Boris Z. Ryabenko, both of Voroshilovgrad; Boris Y. Ekber, Moscow, all of U.S.S.R.

[73] Assignee: Voroshilovgradsky Mashinostroitelny Instit, U.S.S.R.

[21] Appl. No.: 781,923

[22] Filed: Sep. 30, 1985

[51] Int. Cl.[4] .............................................. F16K 3/18
[52] U.S. Cl. ...................................... 251/84; 251/88; 251/204
[58] Field of Search .................. 251/84, 85, 86, 87, 251/88, 193, 194, 196, 195, 197, 198, 199, 200, 201, 202, 203, 204

[56] References Cited

U.S. PATENT DOCUMENTS 3,038,692  6/1962  Holmes ............................... 251/204
4,294,427  11/1981  Cliny .................................. 251/194

Primary Examiner—Martin P. Schwadron
Assistant Examiner—Stephen M. Hepperle
Attorney, Agent, or Firm—Lilling & Greenspan

[57] ABSTRACT

A gate valve has a housing provided with a passage embraced by a valve seat for a fluid medium, carrying solid particles, to flow therethrough. A gate is provided which is connected to a rod of a drive through a beam member. A hole in the beam member receives a shank with a clearance extending axially of the rod. Ends of the beam are pliable in an axial direction relative the passage and the beam ends have bevels to engage with stops of the housing. The housing has a projection to limit the travel of the gate axially of the rod.

2 Claims, 7 Drawing Figures

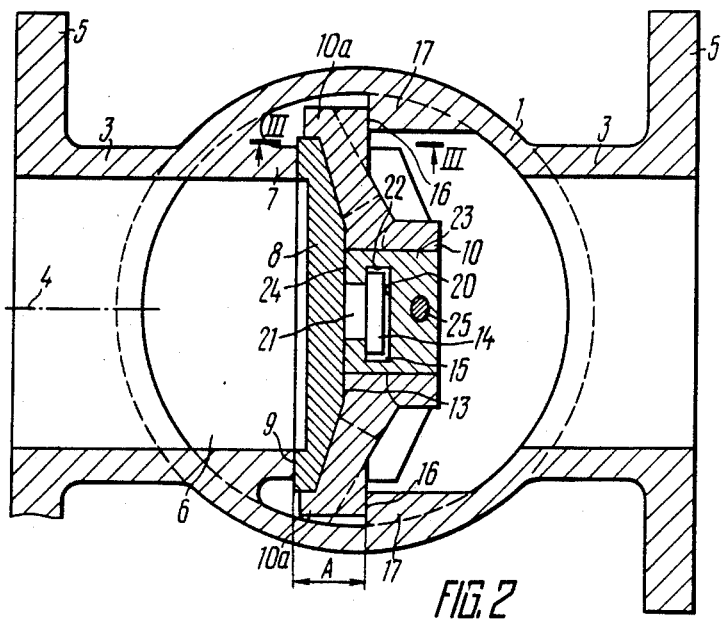
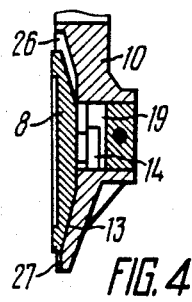
FIG. 4
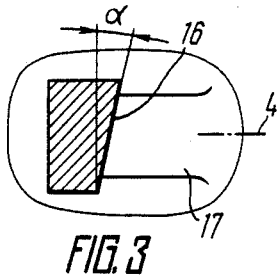
FIG. 3
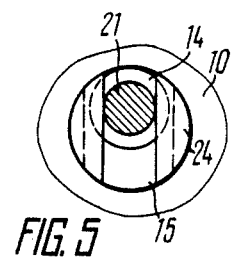
FIG. 5
FIG. 2

GATE VALVE

FIELD OF THE INVENTION

This invention relates to pipeline fittings, and more particularly to a gate valve.

The gate valve embodying the present invention can find application in transmission pipelines carrying suspensions of loose abrasive materials, such as slurry.

The proposed gate valve can also be used in the mining, construction, chemical and other industries employing pneumatic and hydraulic pipeline transmission system for conveying fluid suspensions containing solids, and other fluid media.

BACKGROUND OF THE INVENTION

At present, wide use has been found for pipeline transmission systems for conveying suspensions of solid loose materials in water or other fluid media. Main pipelines are being constructed on a large scale for the transmission in water of minerals at long distances. A number of countries are making use of such systems for transporting coal, ore and other minerals.

Reliable operation of such systems depends largely on the performance of pipeline fittings, particularly gate valves, which are essential for hydraulic pipeline transmission.

Gate valves are even more popular in hydraulic transmission pipelines used in mineral resources treatment factories. These include dressing mills of coal mining and related industries, where concentration processes are carried out in a water medium.

Extensive use of gate valves is associated with hydraulic recovery of fossils, civil engineering and other applications.

Elements of major functional importance in a gate valve are its gate and valve seat. Reliable abutment of the gate to the valve seat is essential to ensure the absence of leaks in the gate valve passage and to extend the service life of these mating parts.

In view of the aforementioned, the provision of gate valves capable of reliably blocking the flow of slurries carrying solid particles is a major problem to be solved in the art.

DESCRIPTION OF THE PRIOR ART

There is known a gate valve in which the housing has a passage embraced by a valve seat for a fluid medium carrying solid particles to be admitted and passed therethrough (cf. U.S. Pat. No. 4,294,427).

The housing of this gate valve accommodates a gate in the form of a disk.

The gate is connected to a drive rod through a holder in the form of a beam.

The drive imparts reciprocations to the gate for closing and opening the passage of the housing.

When moved to the axis of the passage, one side of the gate mates with the valve seat to close the passage.

In this manner the flow of slurry through the passage of the housing is terminated.

The other side of the gate is rigidly affixed to a shank received by a beam hole. This beam hole is in line with the axis of the passage in the closed position of the gate.

When acted upon by the drive rod, the beam exerts force and the shank moves the gate transversely of the centerline of the passage.

The shank is capable of turning in the beam hole, whereby the gate can turn about its axis to ensure a more uniform wearing of the mating surfaces of the gate and valve seat and thus increase their service life. Wear of these surfaces results from mutual friction during closing and opening of the passage.

At the central portion of its other side, the gate adjoins the beam.

Bevels are provided on the beam axially of the rod, whereas the housing has stops with bearing surfaces thereof running in parallel with the surfaces of the bevels, the stops being spaced apart relative to the passage.

The bevels are inclined at an acute angle to the travelled path of the gate in the closed position of the passage.

The stops and bevels of the beam serve to ensure tight abutment of the gate to the valve seat, whereby leaks of slurry while the passage is closed are prevented.

However, when the passage is being closed, the surface of the gate tends to slide relative to the mating surface of the valve seat accompanied by simultaneous drawing of the gate toward the valve seat.

This results in scratches and damage to the mating surfaces of the gate and seat, which in turn can cause escape of the slurry from between these surfaces and a failure to tightly close the passage of the housing.

The presence of solid particles in the fluid conveyed through the passage of the gate valve still further accelerates wear of the above surfaces to result in a shorter service life and less reliable operation of the gate valve.

The solid particles in the fluid medium further promote faster wearing of the beam bevels and stops of the housing affecting the reliable closing of the passage in the housing.

SUMMARY OF THE INVENTION

It is the principle object of the present invention to provide a gate valve in which a beam, its connection to a gate and the housing of the gate valve would be so constructed as to ensure an extra force to press the gate to the valve seat subsequent to closing of the passage in the housing, thereby compensating for changes in the dimensions of the beam and housing caused by the wear of beam bevels and stops of the housing.

Another object is to provide a structurally reliable gate valve.

One more object is to provide a gate valve capable of longer service life.

These objects and other attending advantages are attained by providing a gate valve which has a housing with a passage embraced by a valve seat to admit thereinto and convey therethrough a fluid medium carrying solid particles. The housing accommodates a gate connected through a beam member to a rod of a drive means which imparts reciprocating motions thereto to open and close this passage and is intended to mate at one of its sides with the valve seat, while at the other side the gate is rigidly connected to a shank received by a hole made in the beam which has at its ends bevels engaged with stops provided at the inner surface of the housing and spaced apart relative to the passage. According to the invention, the housing has a projection serving to limit the travel of the gate in an axial direction relative the drive rod, whereas provided axially of this rod between the shank and the beam wall accommodating the hole is a clearance or space, the ends of the beam having bevels which are pliable axially relative to the passage.

The projection made on the inside surface of the housing of the gate valve according to the invention makes it possible to stop the gate during the closing of the passage of the gate valve housing. This action prevents mutual sliding of the mating surfaces of the valve seat and gate during further travel of the beam toward the axis of the passage to force the gate to the valve seat.

The provision of a clearance or gap between the shank and the beam wall accommodating the hole allows the further travel of the beam while the gate remains stationary.

Drawing of the gate toward the valve seat without mutual sliding of their mating surfaces makes these surfaces less susceptible to tearing and scratching which causes their damage and failure. Such an arrangement ensures a more reliable and tight closing of the passage, whereby the life of the gate valve is increased.

The pliable ends of the beam make it possible to move the gate axially relative to the rod a distance equal to the value of said clearance or gap, which in turn make it possible to compensate for changing dimensions of the beam and housing due to wear of beam bevels and stops of the housing caused by the fluid medium carrying solid particles.

Preferably, in the closed position of the gate the beam bevels rest in a plane extending through the axis of the passage perpendicularly relative to the axis of the rod.

Such an arrangement of the bevels ensures a more uniformly distributed compression of the gate to the valve seat and more uniform deformation of the beam during the closed passage of the housing.

The above feature provides a tighter mating between the gate and seat resulting in a more reliable closing of the passage.

Advisably, the beam hole is blind. A part of the shank adjacent the end of the beam hole is secured to the gate and has a diameter, as measured perpendicularly to the axis of the rod, less than that of the remaining portion of the shank, the hole of the beam having a shape and dimensions identical to those of the shank if viewed in a plane extending substantially similar to the axis of the passage perpendicularly relative to the axis of the rod during the closed position of the gate.

The blind hole in the beam protects the shank from the flow of fluid medium carrying solid particles to result in extended service life of the shank.

The aforedescribed arrangement of the shank and beam hole makes it possible to secure the gate and beam without resorting to their mutual displacement axially of the passage. Also, it enables the gate to turn during the closing of the passage and in the course of further movement of the beam while the gate rests in place and the passage of the housing is closed.

In view of the foregoing, the gate valve embodying the present invention provides complete and reliable closing of the passage by the gate and is characterized by a longer service life.

BRIEF DESCRIPTION OF THE DRAWINGS

The invention will now be described in greater detail with reference to a specific embodiment thereof taken in conjunction with the accompanying drawings, in which:

FIG. 2 is an enlarged cross sectional view taken along the line II—II in FIG. 1;

FIG. 3 is a cross sectional view taken along the line III—III in FIG. 2;

FIG. 4 is a cross sectional view of the mutual positioning of the gate and beam with a shank while the passage of the housing is in an open position;

FIG. 5 is an enlarged cross sectional view taken along the line V—V in FIG. 1;

DETAILED DESCRIPTION OF THE INVENTION

Figure 1:
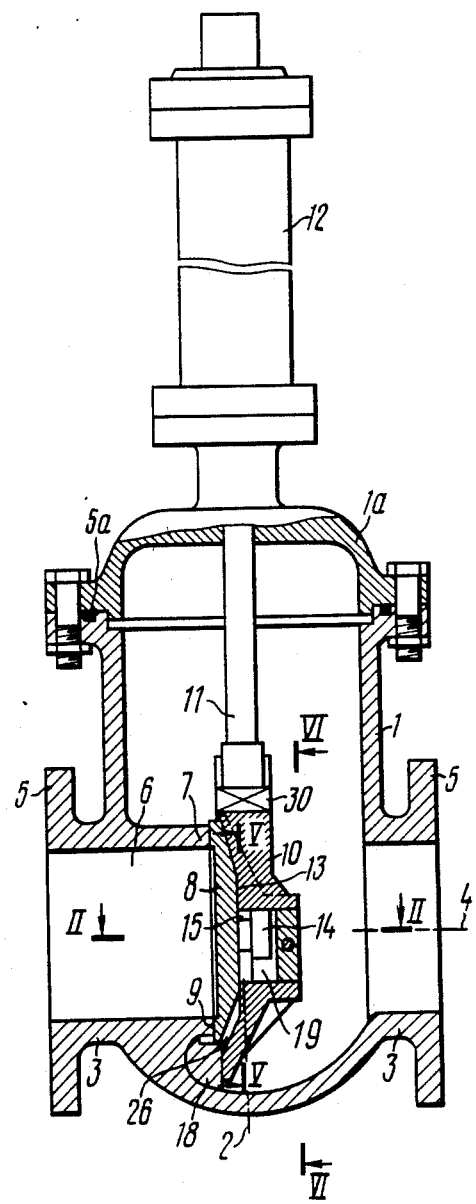
FIG. 1 is a longitudinal sectional view of a gate valve illustrating the invention with the passage of the housing in a closed position.

A gate valve embodying the present invention comprises a housing 1 (FIG. 1) having the form of a hollow cylinder with a vertical axis 2.

Arranged integrally with the housing 1 are tubes 3, having an axis 4 which is perpendicular to the axis 2.

The ends of the tubes 3 are provided with flanges 5 for connection to a pipeline (not shown) wherethrough a fluid medium carrying solid particles, such as a slurry, is conveyed.

Connected by means of any conventional bolted joints (not indicated by reference numerals) to the upper part of the housing 1 is a cover plate 1a. The abutment between the cover plate 1a and the housing 1 is pressure-sealed by an annular elastic seal 5a.

The housing 1 has a passage 6 extending through the tubes 3 and serving to admit and let out the fluid medium being transmitted by the pipeline.

The passage 6 has an axis which is in line with the axis 4 of the tubes 3.

The passage 6 is enclosed by a valve seat 7 inside the housing 1, this seat 7 being integral with the housing 1.

The housing 1 accommodates a gate 8 having a surface 9 on one of its sides (not indicated by a reference numeral) which engages the valve seat 7 to close the passage 6. The gate 8 is arranged in symmetry with the axis of the passage 6 when the gate 8 is closed.

The gate 8 is connected through a beam 10 to a rod 11 of a drive 12, the drive 12 being in this case fashioned as a hydraulic power cylinder of any known construction suitable for the purpose. The drive 12 is intended to reciprocate the gate 8 when closing and opening the passage 6. The drive 12 is secured to the cover plate 1a in any known suitable manner. The axis of the rod 11 coincides with the axis 2 of the housing 1.

The gate 8 has a back surface 13 of the side farthest from the valve seat 7. Bonded by welding to this surface 13 of the gate 8 is a shank 14 serving to connect the gate 8 to the beam 10.

Arranged in the center of the beam 10 in proximity to the axis 4 of the passage 6 in the closed position of the gate 8 is a hole 15 which receives the shank 14 of the gate 8.

Ends 10a (FIG. 2) of the beam 10 have bevels 16, whereas the inner surface (not indicated by a reference numeral) of the housing 1 is provided with stops 17 spaced apart relative to the passage 6.

The bevels 16 of the beam 10 serve to engage with the stops 17 of the housing 1 in the closed position of the passage 7 to ensure compression of the gate 8 to the valve seat 7. This provides reliable closing of the passage 6 by the gate 8.

In the closed position of the gate 8 the bevels 16 of the beam 10 rest in a plane substantially similar to the axis 4 of the passage 6 and perpendicularly to the axis of the rod 11 coinciding with the axis 2 of the housing 1.

The bevels 16 and the surfaces of the stops 17 engageable therewith during the closed position of the passage 6 of the housing 1 are inclined at an angle α (FIG. 3) to a plane which is perpendicular to the axis 4 of the passage 6 of the housing 1. It has been found through experiments that the angle α should preferably range from 5° to 15°; in the embodiment being discussed this angle α amounts to 12°.

Referring again to FIG. 1, the housing 1 has a projection 18 to limit the travel of the gate 8 axially relative to the rod 11, the axis of the rod 11 coinciding with the axis 2 of the housing 1.

The above arrangement makes it possible for the gate 8 to be pressed against the valve seat 7, whereas the surface 9 of the gate 8 and the mating surface of the valve seat 7 become less susceptible to damage due to tearing caused by solid particles carried by the slurry through the passage 6 of the housing 1 of the gate valve.

Such drawing of the gate 8 to the seat 7 makes closing of the passage 6 more reliable to increase the service life of the gate valve.

A clearance or gap 19 is allowed between the shank 14 and hole 15 in the beam 10 in line with the axis of the rod 11 coinciding with the axis 2 of the housing 1.

As seen best in FIG. 1, the gap 19 is below the shank 14 to correspond to the position of the gate 8 when the passage 6 is in its closed position. When the passage 6 is open, the gap 19 is above the shank 14, as seen best in FIG. 4.

The provision of the gap 19 promotes the free movement of the beam 10 along the axis 2 under the action of the rod 11 of the drive 12 to additionally press the gate 8 to the seat 7 when the passage 6 is closed and the gate 8 is resting in place.

The bevels 16 of the beam 10 are at the ends 10a (FIG. 2) which in the closed position of the passage 6 assume a position opposite the stops 17 of the housing 1.

The ends 10a of the beam 10 feature a certain amount of pliability due to the fact that their cross-section and the material of the beam 10 are selected so as to ensure tight engagement between the gate 8 and valve seat 7 due to resilient deformation.

If the members of the gate valve were not subject to wear by particles contained in the solid phase, in order to urge the gate 8 against the seat 7 it would be sufficient for the value of the gap 19 to be at least the ratio of the linear value of the deflection of the beam 10 due to the resilient strain to the tangent of the angle α of inclination of the stop 17 of the housing 1 and the bevel 16 of the beam 10.

The bevels 16 of the beam 10, the surfaces of the stops 17 of the housing 1, and the surfaces of the seat 7 and gate 8 mating during the closed passage 6 of the housing 1 are susceptible to quick wearing by solid particles carried by the slurry flowing through the passage 6 of the housing 1. As a result of such wear, the size A (FIG. 2) characterizing the thickness of the gate 8 in assembly with the beam 10 equalling the distance from the surface 9 of the gate 8 to the bevels 16 taken along the axis 4 in the closed position of the passage 6, tends to reduce.

For the same reason, the distance from the surface of the seat 7 engageable with the gate 8 to the surfaces of the stops 17 of the housing 1 engageable with the bevels 16 of the beam 10 as measured along the axis 4 of the passage 6 tends to increase.

Close contact between the gate 8 and the valve seat 7 subsequent to their wearing by solid particles carried by the slurry in response to the application of a force which is not less than that exerted on the gate 8 when these elements are new is ensured by extra movement of the beam 10 relative to the immovable gate 8.

The extent of this extra movement does not exceed the extent of movement necessary to deform the pliable ends 10a of the beam 10. Taking this into consideration, the entire gap 19 must be not less than, or in this case, equal to, the ratio between the double magnitude of deflection of the beam 10 due to resilient deformation and the tangent of the angle α of inclination of the stops 17 of the housing 1 and bevels 16 of the beam 10.

Pliability of the ends 10a of the beam 10 ensures more reliable closing of the passage 6 of the housing 1 and compensates for the wearing of the gate 8, beam 10 and housing 1 caused by abrasive particles carried by the slurry flowing through the passage 6 of the housing 1.

In the closed position of the gate 8 the bevels 16 of the beam 10 occupy a plane passing substantially similar to the axis 4 of the passage 6 perpendicularly relative to the axis of the rod 11 coinciding with the axis 2 of the housing 1, more specifically the average lines of the bevels 16 rest in said plane.

This positioning of the bevels 16 of the beam 10 ensures a more uniform engagement of the gate 8 with the valve seat 7 to improve the sealing of the closed passage 6 of the housing 1.

One feature of the invention provides that the hole 15 in the beam 10 is a blind hole and has a bottom 20 (FIG. 2).

In this manner the shank 14 of the gate 8 is protected from the flow of slurry carrying solid particles and travelling through the passage 6 of the housing 1.

The provision of the bottom 20 in the hole 15 extends the service life of the shank 14.

Part 21 of the shank 14 adjacent its end bonded to the gate 8 has a diameter less than the rest of the shank as measured perpendicularly to the axis of the rod 11.

The hole 15 in the beam 10 has in a plane passing substantially similar to the axis 4 of the passage 6 in a direction substantially perpendicular to the axis of the rod 11 during the closed position of the gate 8, a shape and dimensions identical to the shape and dimensions of the shank 14, as seen best in FIG. 2.

As represented in FIG. 2, in the gate valve embodying the present invention the hole 15 has a T-shaped configuration, whereas in other alternative embodiments its walls 22 can be inclined to the axis 4 of the passage 6 of the housing 1, or these walls may be curvilinear.

Such a shape of the shank 14 of the gate 8 and that of the hole 15 of the beam 10 facilitates reliable engagement of the gate 8 with the beam 10. This also ensures axial, turning of the gate 8 about its axis coinciding with the axis 4 during the closed position of the passage 6 of the housing 1.

To be more convenient for assembly, the beam 10 is a composite, viz., it has a cylindrical insert 23 received by a hole (not indicated by a reference numeral) in the central portion thereof (not indicated) extending in line with the axis 4 of the passage 6 in the closed position of the gate 8.

The hole 15 is made in the cylindrical insert 23 on the side of its end face 24.

Sectionally, the hole 15 in the cylindrical insert 23 is fashioned as a groove best seen in FIG. 5 and extending throughout from the upper limit of its end face 24 as seen in FIG. 5 to its lower limit.

This makes it easy to insert the shank 14 into the hole 15 in the cylindrical insert 23 to be accommodated in the hole 15 of the beam 10.

Figure 6:
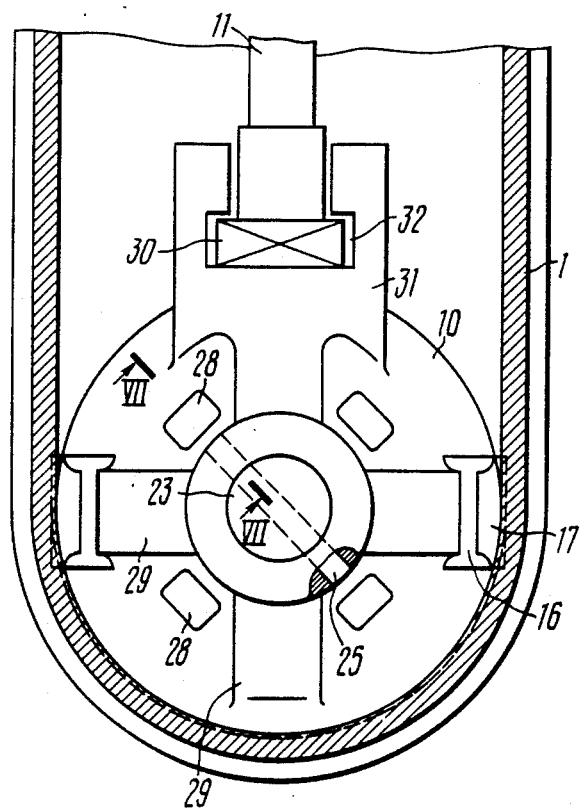
FIG. 6 is an enlarged cross sectional view taken along the line VI—VI in FIG. 1.
Figure 7:
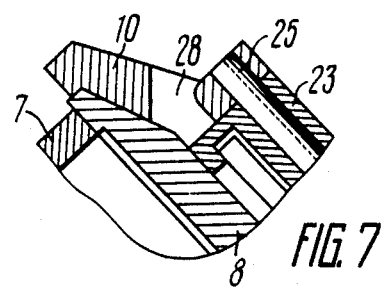
FIG. 7 is an enlarged cross sectional view taken along the line VII—VII in FIG. 6.

The cylindrical insert 23 is secured in the beam 10 by means of a pin 25 (FIGS. 2, 6 and 7).

The aforedescribed arrangement ensures easy assembling and dismantling of the gate 8 with the beam 10, while ensuring their reliable interconnection.

In order to prevent the gate 8 from wearing by solid particles carried by the slurry flowing through the passage 6 of the housing 1, the beam 10 has the form of a shell configurated as represented in FIGS. 1, 2 and 4 so that it embraces the gate 8 on its face 13.

For free travel of the beam 10 along the axis 2 of the housing 1 relative to the immovable gate 8 closing the passage 6 of the housing 1, a blind hole (not indicated by a reference numeral) enclosing the gate 8 forms a clearance or recess 26 (FIGS. 1 and 4) with the gate 8 in line with the axis 2 of the housing 1. Depending on the position of the gate 8 relative to the axis 4 of the passage 6, this clearance 26 either underlies (FIG. 1) or overlies (FIG. 4) the gate 8.

In order to assure displacement of the gate 8 from the projection 18 (FIG. 1) during closing of the passage 6 of the housing 1, the beam 10 is provided with a recess 27 (FIG. 4).

Passages 28 (FIGS. 6 and 7) extend in the beam 10 from its surface confronting the valve seat 7 in the direction of the gate 8 and cylindrical insert 23, through which solid particles of the slurry entering the abutment areas between the gate 8 and beam 10 are evacuated, thus assuring unobtrusive travel of the beam 10 relative to the gate 8, during the closed position of the passage 6 of the housing 1.

For reduced weight the beam 10 is quite thin, its strength and pliability being assured by the provision of ribs 29 (FIG. 6).

The rod 11 has an end 30 (FIGS. 1 and 6), whereas the beam 10 has in its upper portion a projection 31 (FIG. 6) in which there is provided a T-shaped recess 32.

The T-shaped recess 32 accommodates the end 30 of the rod 11 to ensure connection of the rod 11 to the beam 10 for the latter to move for closing and opening the passage 6 by the gate 8.

A gate valve embodying the present invention and illustrated in FIGS. 1 to 7 operates in the following manner.

By actuating the drive 12 the rod 11 is caused to move from its initial topmost position (not shown) downwards inside the housing 1 to act through the end 30 rigidly attached at the end of the rod 11 on the beam 10 and make the beam 10 travel downwards.

The cylindrical insert 23 secured by means of the pin 25 in the beam 10 moves downwards therewith.

Accordingly, the movement of the beam 10 causes the downward travel of the gate 8, the shank 14 of which accommodates in the hole 15 of the beam 10.

Due to the identical dimensions and shape of the shank 14 of the gate 8 and hole 15 of the beam 10 in a plane passing through the axis 4 of the passage 6 and extending perpendicularly to the axis of the rod 11 during the closed position of the gate 8, the gate 8 is capable of turning about its axis.

By virtue of such a capability of axial turning, different portions of the surface of the gate 8 mating with the valve seat 7 occupy the bottom portion as seen in FIG. 1.

Because wearing of this surface of the gate 8 is most pronounced in its lowest portion due to higher flow velocities, the aforedescribed turning of the gate facilitates more uniform wearing and extends its service life.

Initially, during its downward travel the gate 8 tends to assume under the force of gravity a position illustrated in FIG. 4. Therewith, a clearance 26 is in evidence between the gate 8 and beam 10, whereas a gap 19 is present between the shank 14 of the gate 8 and hole 15 of the beam 10.

These clearances 19 and 26 make it possible for the beam 10 to move downwards during the closing of passage 6 of the housing 1 as seen best in FIG. 1; the gate 8 bearing on the projection 18 of the housing 1 to remain in a stationary position.

By its bevels 16 the beam 8 engages with the stops 17 of the housing 1 disposed in the closed position of the gate 8 in a plane passing through the axis 4 of the passage 6 perpendicularly to the axis of the rod 11.

As a result of such an engagement of the bevels 16 with the stops 17, the beam 10 exerts uniform pressure on the gate 8 for the latter to uniformly mate with the valve seat 7.

Due to the provision of the clearances 19 and 26, and by virtue of the aforedescribed shape of the beam 10 and pliability of the ends 10a, the beam 10 can move downwards while the gate 8 remains stationary, whereby the possibility of damage of the mating surfaces of the seat 7 and gate 8 is minimized.

In turn, this ensures a more reliable and tight closing of the passage 6 in the housing 1.

Also, changes in the dimensions of the housing 1, gate 8 and beam 10 occuring due to wear by solid particles carried by the slurry flowing through the passage 6 are compensated for by the pliable ends 10a of the beam 10.

Such compensation is further facilitated by the valve of the clearances 19 and 26 equalling a ratio between twice the magnitude of deformation of the ends 10a of the beam 10, which ensures tight closing of the passage 6, and the tangent of the angle $\alpha$ of inclination of the bevels 16.

The beam 10 moves downwards until the gaps 19 and 26 are displaced from a top position shown in FIG. 4 to a bottom position as illustrated in FIG. 1.

The beam 10 can freely travel relative to the gate 8 during the closed position of the housing 1 due to the provision of passages 28 in the beam 10 wherethrough solid particles of the slurry entering the gaps 19 and 26 are evacuated to the passage 6.

The arrangement of the beam 10 in the form of a shell embracing the gate 8 makes it possible to prevent excessive wear thereof by the solid particles of the slurry.

The passage 6 of the housing 1 opens when the rod 11 moves upwards (FIG. 1). The end 30 of the rod 11 acts to move the beam 10 upwards. Therewith, the gate 8 rests in place until the gaps 19 and 26 are no longer present in the bottom portion (FIG. 1) between the gate 8 and beam 10 and between the shank 14 and hole 15 in the beam 10.

Concurrently, the bevels 16 of the beam 8 are brought out of engagement with the surfaces of the stops 17, whereby the beam 10 stops forcing the gate 8 to the valve seat 7.

When the beam 10 assumes its topmost position relative to the gate 8 (FIG. 1), the wall of its hole 15 cooperates with the shank 14 of the gate 8.

In subsequence, the gate 8 starts its upward movement.

The upward travel of the gate 8 during the opening of the passage 6, without the beam 10 exerting a pressure to force it to the seat 7, increases its service life and makes it less susceptible to damage.

Prototypes of the proposed gate valve have passed through tests and proved reliable in operation when installed in transmission pipelines of coal beneficiation plants carrying slurry containing solid particles of coal and rock.

The gate valve embodying the present invention is easy to operate by virtue of the provision of a compression force between the mating surfaces of the gate and valve seat which ensures a tight closing of the gate valve passage while featuring a longer service life.

What is claimed is:

1. A gate valve comprising:

a housing accommodating a passage having first and second ends, said first end of said passage admitting a fluid medium carrying solid particles into said housing and said second end of said passage exiting said fluid medium from said housing;

a seat located inside said housing and surrounding said passage;

a gate having a first and second side and being accommodated in said housing adjacent to said first end of said passage, said first side of said gate cooperating with said seat;

a drive means connected to said housing and having a rod being accommodated in said housing;

a beam accommodating a hole and located near said second side of said gate and connecting said gate to said rod of said drive alternating said gate in a forward and backward direction opening and closing said first end of said passage, said beam having ends being pliable in an axial direction relative to an axis of said passage, and said beam accommodating a recess having walls, said recess receiving a portion of said second side of said gate opposing said seat, said beam having walls accommodating said recess and said portion of said second side of said gate defining a clearance, and said beam having bevels being located near said ends of said beam, a plane including both bevels defining an angle of inclination relative to an axis of said rod of said drive;

a shank being received in said hole in said beam and defining a gap between said shank and an inside wall of said beam hole in a direction substantially similar to an axis of said rod, said gap having a value measurement being at least equal to a value measurement of said clearance between said recess walls and said portion of said gate, and said shank having first and second parts, said first part connected to a second side of said gate and having a diameter dimension smaller than a diameter dimension of said second part of said shank, said diameters being measured in a perpendicular direction relative to said axis of said rod of said drive, and said shank having a shape and dimensions, being measured in a plane substantially similar to an axis of said passage and said axis of said rod relative to said gate in a closed position, substantially the same as a shape and dimensions of said hole in said beam; and stops located at an inner surface of said housing and being spaced apart relative to said axis of said passage, said stops cooperating with said bevels at said ends of said beam.

2. A gate valve according to claim 1, wherein said gap between said shank and said beam wall accommodating said holes has a value measurement directly proportional to a double magnitude of deformation of each of said beam ends and said value measurement of said gap is inversely proportional to the tangent of the angle of inclination of said bevels being located at said ends of said beam in a perpendicular plane relative to said axis of said passage in said housing.

* * * * *